United States Patent
Smets et al.

(10) Patent No.: US 10,432,620 B2
(45) Date of Patent: Oct. 1, 2019

(54) BIOMETRIC AUTHENTICATION (71) Applicant: MasterCard International Incorporated, Purchase, NY (US)

(72) Inventors: Patrik Smets, Nijlen (BE); Mehdi Collinge, Braine-l'Alleud (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 442 days.

(21) Appl. No.: 14/614,174

(22) Filed: Feb. 4, 2015

(65) Prior Publication Data
US 2015/0244718 A1 Aug. 27, 2015

(30) Foreign Application Priority Data

Feb. 24, 2014 (EP) .................................. 14156439

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/32* | (2013.01) |
| *G06F 21/34* | (2013.01) |
| *G06F 21/41* | (2013.01) |
| *G06F 21/74* | (2013.01) |

(52) U.S. Cl.
CPC .......... *H04L 63/0861* (2013.01); *G06F 21/32* (2013.01); *G06F 21/34* (2013.01); *G06F 21/41* (2013.01); *G06F 21/74* (2013.01); *G06F 2221/2105* (2013.01)

(58) Field of Classification Search
CPC ..... H04L 63/0861; G06F 21/32; G06F 21/34; G06F 21/74; G06F 21/41; G06F 2221/2105
See application file for complete search history.

(56) References Cited

U.S. PATENT DOCUMENTS

| | | | |
|---|---|---|---|
| 6,898,577 B1 * | 5/2005 | Johnson ............. | G06Q 20/3674 705/317 |
| 2010/0049987 A1 | 2/2010 | Ettorre et al. | |

(Continued)

FOREIGN PATENT DOCUMENTS

| | | | | |
|---|---|---|---|---|
| EP | 2498529 A1 * | 9/2012 | ............. | H04L 63/08 |
| EP | 2498529 A1 | 9/2012 | | |

OTHER PUBLICATIONS

"Communication: Extended European Search Report", dated May 28, 2014, European Patent Office, for European Patent Application No. 14156439.3-1870, 9pgs.

*Primary Examiner* — Trong H Nguyen
*Assistant Examiner* — Amie C. Lin
(74) *Attorney, Agent, or Firm* — Buckley, Maschoff & Talwalkar, LLC (57) ABSTRACT

Instead of requiring key exchange between a trusted biometric application in a TEE and an external application outside of the TEE that provides access to a secured function, the trusted application is preconfigured with security data such as (in a first implementation) authentication credentials (e.g. a PIN) or (in a second implementation) a cryptographic key. This security data is then used to authenticate a biometric validation obtained by the trusted application to the external application.

11 Claims, 9 Drawing Sheets (56) References Cited

U.S. PATENT DOCUMENTS

| | | | |
|---|---|---|---|
| 2014/0179271 A1* | 6/2014 | Guccione | G06F 21/10 455/410 |
| 2014/0282945 A1* | 9/2014 | Smith | G06F 21/32 726/6 |
| 2015/0081554 A1* | 3/2015 | Wong | G06Q 20/401 705/44 |
| 2015/0106217 A1* | 4/2015 | Radu | G06Q 20/202 705/21 |
| 2015/0121068 A1* | 4/2015 | Lindemann | H04L 63/0823 713/158 |
| 2015/0237046 A1* | 8/2015 | Chang | H04L 63/0861 726/7 |
| 2016/0300051 A1* | 10/2016 | Parthasarathy | G06F 21/10 |

\* cited by examiner

BIOMETRIC AUTHENTICATION

BACKGROUND

The present disclosure relates to controlling access to secured functions of applications using biometric authentication of a user. More specifically, but not exclusively, there are described methods of securely providing access to such secured functions and user devices for carrying out such methods.

As user devices such as smartphones, tablets, laptop and desktop computers are increasingly used for sensitive operations such as payments from bank accounts and credit cards, management of financial accounts and confidential communication, means of ensuring only an authorised user can perform such operations are required.

Users are generally required to verify their identity by entering one or more items of remembered information such as a Personal Identification Number (PIN), password, passcode or answer to a security question into a user interface of the user device. However, such items of information can be difficult to remember, difficult to keep secret if recorded and readily guessable if poorly chosen.

Biometrics, the identification of individuals using (effectively) unique physical characteristics such as fingerprints, iris patterns and DNA, can also be used for verification of user identity. Biometric authentication is generally regarded as more secure than authentication with any combination of remembered secret information items since such physical characteristics are much harder to copy and replay than remembered information. Further, the user always carries their biometric authenticators so is relieved of the burden of memorising secret information items.

Biometrics generally involve collecting data relating to a user requesting access to a particular secured activity (such as use of a secured function of a computer application) from a sensor device such as a fingerprint reader or iris scanner, and comparing that data with reference data stored for one or more individuals. If the collected data is determined to match the reference data for an individual who is recorded as being authorised to access a secured activity, then access to that activity can be granted.

Figure 1:
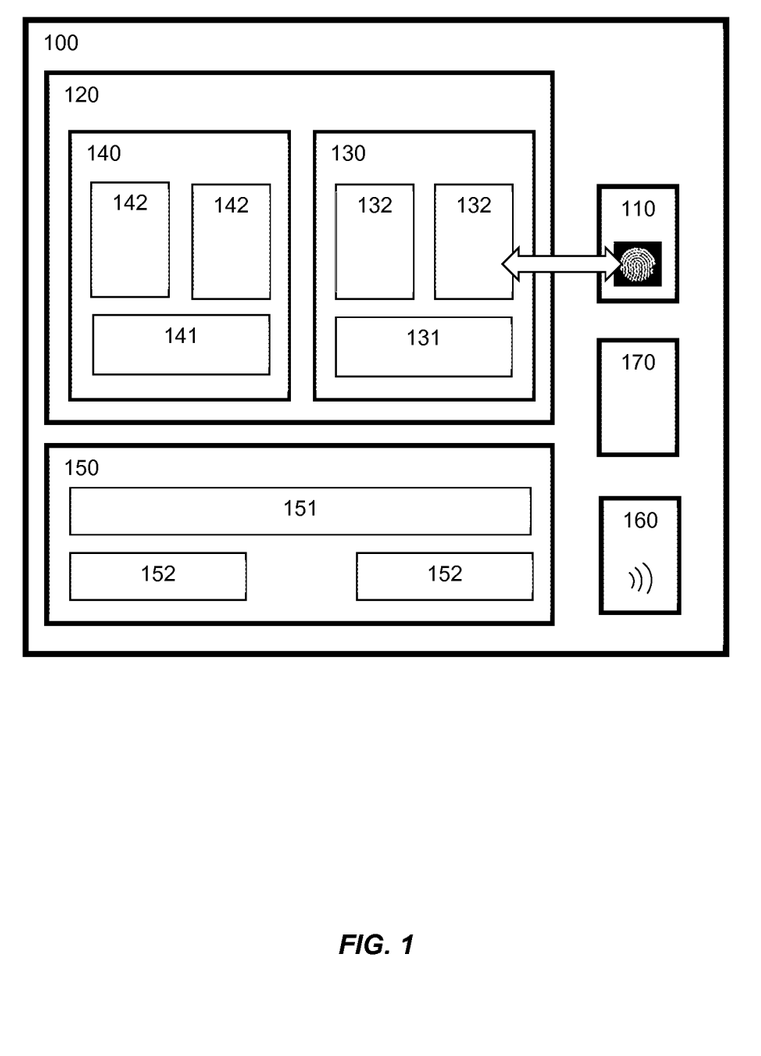
FIG. 1 schematically illustrates a generic user device with biometric functionality.

FIG. 1 is a schematic of a generic user device 100 with biometric functionality. Only components considered pertinent to the discussion below are shown; it is to be understood that other components typically found in user devices could also be included.

To protect the data captured, a biometric sensor device 110 such as a fingerprint sensor generally either has its own secure environment or is connected to a secure environment of a main processor 120 of a user device as shown in FIG. 1. Such a secure environment is often referred to as a Trusted Execution Environment (TEE) 130, to distinguish it from the regular (non-secure) execution environment of the main processor, often referred to as the Rich Execution Environment (REE) 140. The TEE or its equivalent generally contains a trusted operating system (OS) 131 and one or more trusted applications 132. Similarly, the REE generally contains an OS 141 (for example Android™ or iOS™) and one or more applications 142. The user device could also contain a Secure Element (SE) 150 (for example, a Subscriber Identity Module, SIM, an embedded Secure Element, eSE, or a Secure Digital, SD, card of a mobile telephone). The SE generally contains a secure OS 151 (for example a combination of JavaCard™ and Global Platform™) and one or more secure applications 152 such as cardlets. The user device can also contain other functional and structural features such as, for example, a Near Field Communication (NFC) controller 160 (e.g. for facilitating mobile payment), which could be integrated into the SE, and one or more user interface devices 170 (for example a touchscreen, keyboard, mouse, touchpad or microphone).

An application having one or more secured functions could reside in the REE (as one of applications 142), the SE (as one of applications 152), partially in the REE and partially in the SE (as a combination of one of applications 142 and one of applications 152) or in an external host accessible through a connection with an application on the user device (for example one of applications 142 of the REE). Such an application could be any biometrically authenticated application, for example a mobile payment application for facilitating face-to-face and internet payments from a debit or credit card, a loyalty application for collecting and redeeming loyalty points, or an authentication application for getting access to a service.

The output of the sensor device 101 (or associated logic of a linked trusted application 132) is generally either a single binary bit (yes/no), a percentage or another binary value to indicate confidence level of matching between the biometric data collected from a user and the reference data for an individual authorised to access a secured function the user has requested access to. If the application that provides this secured function resides outside of the TEE however, this output must be passed to said application, at least in the case that the output indicates a positive result: a biometric validation of the user. A single bit message or a binary value expressing a confidence level is very easily spoofed by malicious third parties. Therefore some means of authenticating the origin of the biometric validation is generally provided.

Typically, a secure channel is set up between the trusted application 132 associated with the sensor device 110 and the application 142 or 152 providing access to the user-requested secured function. This can be by any suitable cryptographic technique, for example authenticating the biometric validation with a key known only to those two parties.

However, the TEE is generally not provided by the same entity as the application 142 or 152 providing access to the user-requested secured function and is generally not provided at the same time. The former is generally incorporated into the user device by the manufacturer before it is issued to the user, while the latter is generally an optional add-on which the user purchases from or signs up for with the secured function provider (for example their bank, credit card provider or email provider) at a later date. This situation causes a number of problems with setting up of the secure channel.

Firstly, the channel is vulnerable to man-in-the-middle attacks since, before it can be used, the key must be exchanged between the trusted application 132 associated with the sensor device 101 and the application 142 or 152 providing access to the user-requested secured function. Key exchange mechanisms are well known in the industry, but require complicated processing and signalling which take time and power to complete, both valuable resources for user devices, especially mobile devices which are generally battery-powered.

Secondly, application 142 or 152 providing access to the secured function might not have such a key exchange mechanism pre-programmed so a modification to the application could be required.

Thirdly, in order to facilitate key exchange, significant collaboration (for example standardisation of the key exchange mechanism, key distribution etc.) is required between the entities providing the TEE and the application 142 or 152 providing access to the user-requested secured function. Such collaboration is not always easy or desirable.

What is needed is a method of biometrically authenticating a user for use of a secured function which does not require modification to an application providing access to that secured function and which does not require cryptographic key exchange between a TEE and that application.

SUMMARY

According to a first aspect there is provided a computer-implemented method comprising: a trusted application of a Trusted Execution Environment obtaining registration credentials; subsequent to said obtaining of said registration credentials, the trusted application obtaining: an indication that a user requires access to a secured function accessible through an external application outside of said Trusted Execution Environment, and a biometric validation of said user's identity; and in response to said obtaining of both said indication and said biometric validation, the trusted application directing authentication credentials dependent on the registration credentials towards said external application to request use of said secured function.

Said authentication credentials could comprise at least some of the registration credentials. Alternatively, the method could further comprise the trusted application processing at least some of the registration credentials to produce said authentication credentials.

The method could further comprise the trusted application, prior to obtaining the indication and prior to obtaining the biometric validation, storing the registration credentials together with an identifier of the external application. Alternatively or additionally, the method could further comprise the trusted application, prior to obtaining the indication and prior to obtaining the biometric validation, storing the registration credentials together with an identifier of the secured function.

The obtaining of the registration credentials could comprise receiving at least some of the registration credentials from a user interface device.

The registration credentials could comprise one or more of: a Personal Identification Number, a password, a passcode, an alphanumeric string, an answer to a security question, an identifier of the external application, an identifier of the secured function and biometric reference data.

One or more of the registration credentials could originate from the user or from an issuer of the external application.

The external application could reside in a Secure Element. Alternatively, the external application could reside in a Rich Execution Environment. Alternatively, the external application could reside partially in a Rich Execution Environment and partially in either a Secure Element or an external host accessible through a connection with an application in the Rich Execution Environment.

The method could further comprise the external application receiving said authentication credentials. The method could further comprise the external application, in response to said receiving of the authentication credentials, initiating validation of the authentication credentials. Said validation could be performed by the external application. Alternatively, said initiating validation of the authentication credentials could comprise the external application directing the authentication credentials towards a remote server for validation. Said remote server could be under control of an issuer of the external application. The method could further comprise the external application, in response to said validation of the authentication credentials, initiating provision of access to the secured function the user.

According to a second aspect there is provided a computer-implemented method comprising: a trusted application of a Trusted Execution Environment obtaining a biometric validation of a user's identity; and in response to said obtaining of said biometric validation, the trusted application directing a biometric validation message over a secure channel towards an interface application of said Secure Element configured to communicate with an external application of the Secure Element outside of said Trusted Execution Environment, said external application having a secured function which can only be accessed following validation of said user's identity.

Said interface application could direct a biometric authentication message towards the external application.

Said directing of said biometric authentication message could be in response to one of the trusted application and the external application obtaining an indication that the user requires access to said secured function and subsequently directing a request for said access towards the interface application.

The external application could receive said biometric authentication message and subsequently provide the user with access to the secured function.

Said channel could be secured by means of the trusted application and said interface application both having knowledge of a cryptographic key.

One or both of the external application and said interface application could be cardlets. If both of the external application and said interface application are cardlets, the further request could be made through a Shared Interface Object.

The interface application could be a cardlet having Global Platform Privilege indicating Cardholder Verification Method Management.

Said interface application could be further configured to communicate with a further external application of the Secure Element outside of the Trusted Execution Environment. Said further external application could have a further secured function which can only be accessed following validation of the user's identity. The method could optionally further comprise the interface application directing a further biometric authentication message towards the further external application. Said directing of said further biometric authentication message could be in response to one of the trusted application and the further external application obtaining an indication that the user requires access to said further secured function and subsequently directing a request for access to the further secured function towards the interface application. The method could further comprise the further external application receiving the further biometric authentication message and, subsequent to said receiving of the further biometric authentication message, providing the user with access to the secured function.

According to a third aspect there is provided a computer-implemented method comprising: a trusted application of a Trusted Execution Environment obtaining: an indication that a user requires access to a secured function accessible through an external application of a Secure Element outside of said Trusted Execution Environment, and a biometric validation of said user's identity; and in response to said obtaining of both said indication and said biometric validation, the trusted application directing a request for access to said secured function over a secure channel towards an interface application of said Secure Element configured to communicate with said external application.

Said channel could be secured by means of the trusted application and said interface application both having knowledge of a secret cryptographic key. The method could further comprise, prior to the obtaining of the indication and the biometric validation, preconfiguring the trusted application and the interface application with said key. Said preconfiguring could occur in a user device before it is issued to the user.

The method could further comprise said interface application receiving said request.

The method could further comprise the interface application, in response to said receiving of the request, directing a further request for access to the secured function to the external application. The method could further comprise the external application receiving said further request. The method could further comprise, in response to said receiving of the further request, the external application providing the user with access to the secured function.

Alternatively, the method could further comprise the interface application, in response to receipt of a further request of the external application, providing the external application with an indication that it has received a request for access to said secured function over the secure channel. The method could further comprise, in response to receiving said status, the external application providing the user with access to the secured function.

The external application could be a cardlet. Said interface application could be a cardlet. If both the external application and the interface application are cardlets, then the further request could be in the form of a Shared Interface Object.

The interface application could have Global Platform Privilege indicating Cardholder Verification Method Management.

According to any of the first to third aspects, the biometric validation could be derived from data obtained by a fingerprint reader, a microphone, a camera or an iris scanner.

According to any of the first to third aspects, the external application could be for making payments with a financial account, for example NFC or remote (internet) payments. Alternatively or additionally, the external application could be for managing a financial account.

According to a fourth aspect there is provided a user device configured to perform the method of any of the first to third aspects.

The user device could comprise one or more memories for storing computer program code comprising instructions for performing the method of any of the first to third aspects. The user device could further comprise one or more processors for performing said instructions.

Either of the first and third aspects, and some variations of the second aspect, can be expressed as a trusted application of a Trusted Execution Environment being preconfigured with security data; subsequent to said preconfiguration, the trusted application obtaining: an indication that a user requires access to a secured function accessible through an external application outside of said Trusted Execution Environment, and a biometric validation of said user's identity; and in response to said obtaining of both said indication and said biometric validation, the trusted application directing authentication credentials dependent on the security data towards said external application to request use of said secured function.

According to the first aspect, the security data can comprise the registration credentials. According to the second and third aspects, the security data can comprise a secret cryptographic key known to both the trusted application and the interface application.

BRIEF DESCRIPTION OF THE DRAWINGS

Implementations will now be described in detail, by way of example only, with reference to the accompanying drawings, in which:

FIG. 3b is a flowchart detailing an example of the first implementation for use with the user device of FIG. 3a;

FIG. 4b is a flowchart detailing an example of the second implementation for use with the user device of FIG. 4a;

DETAILED DESCRIPTION

Instead of requiring key exchange between a trusted biometric application in a TEE and an external application outside of the TEE that provides access to a secured function, the trusted application is preconfigured with security data such as (in a first implementation) authentication credentials (e.g. a PIN) or (in a second implementation) a cryptographic key. This security data is then used to authenticate a biometric validation obtained by the trusted application to the external application.

Figure 2:
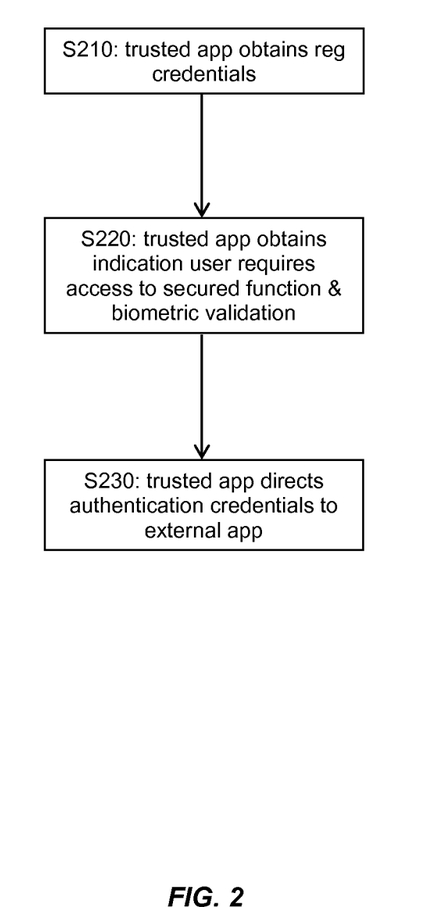
FIG. 2 is a flowchart outlining a method of a first implementation.

FIG. 2 is a flowchart setting out the method of the first implementation. At step S210 a trusted application of a TEE obtains registration credentials. Subsequently, at step S220 it obtains both an indication that a user requires access to a secured function accessible through an external application outside of the TEE and a biometric validation of the user's identity. In response to obtaining both the indication and the biometric validation, at step S230 the trusted application directs authentication credentials dependent on the registration credentials towards the external application to request use of the secured function.

Figure 3A:
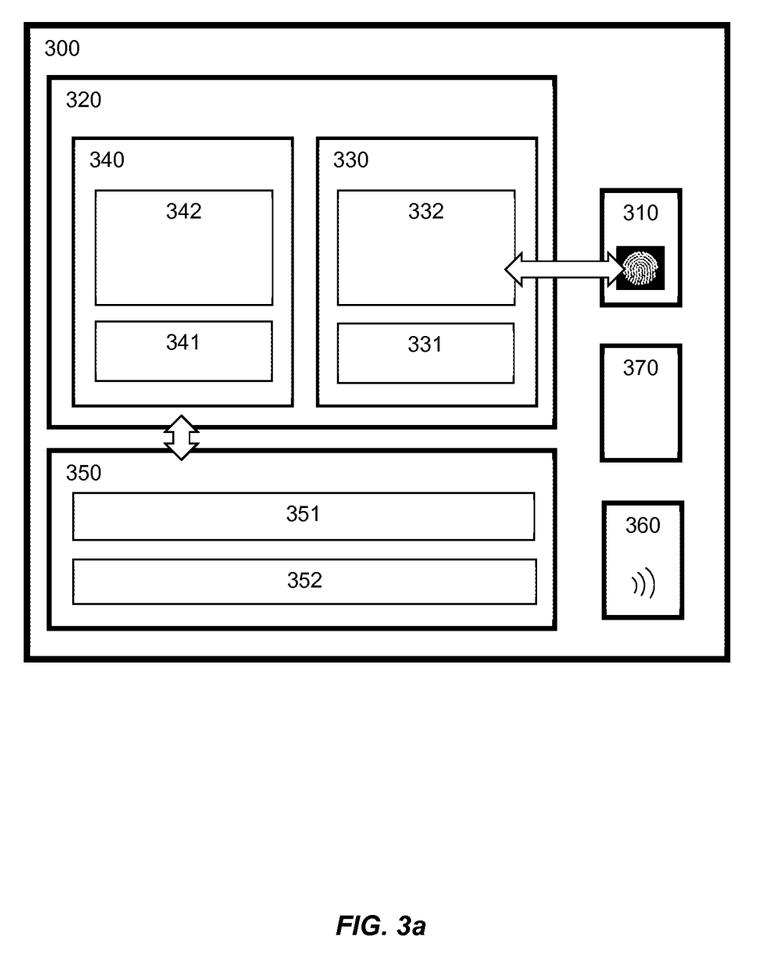
FIG. 3a illustrates a first user device suitable for the first implementation.
Figure 4A:
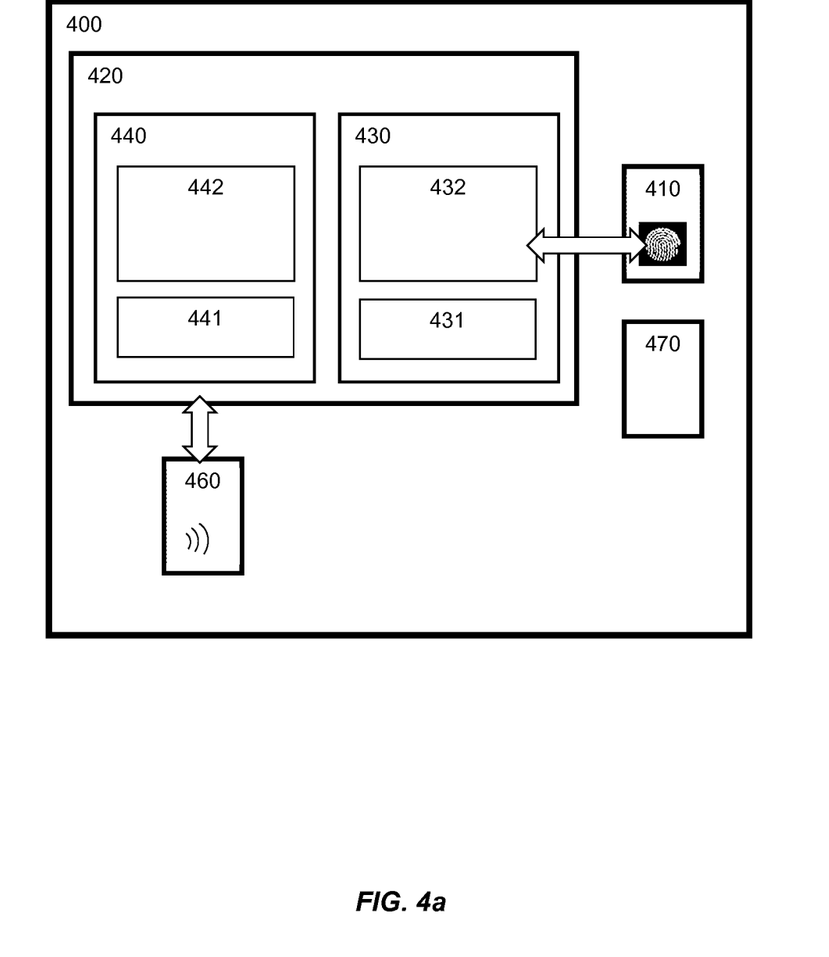
FIG. 4a illustrates a second user device suitable for the first implementation.

FIGS. 3a and 4a illustrate schematically example user device configurations the first implementation is suitable for use with. Both figures omit components which are not pertinent to the methods described for the sake of clarity. It is to be understood that additional components, for example similar to the components of user device 100 of FIG. 1 which do not correspond to components of FIG. 3a or 4a, or other components typically found in user devices, could also be included.

FIG. 3a shows a user device 300 with biometric functionality. Like user device 100 of FIG. 1, it comprises a biometric sensor device 310, a main processor 320 (having a TEE 330 and an REE 340) and an SE 350 (for example a SIM card). The TEE comprises a trusted OS 331 and a trusted biometric application 332. The REE comprises an OS 341 (for example Android™ or iOS™) and an application 342 (for example, a User Interface Software Development Kit (UISDK) app) forming an REE component of a payment application. The SE comprises a secure 351 (for example a combination of JavaCard™ and Global Platform™) and a secure application 352 (for example a mobile payment application cardlet) forming an SE component of the payment application. The user device 300 further comprises at least one user interface device 370 (for example a touchscreen, keyboard, mouse, touchpad or microphone) at least capable of receiving user input. Optionally, the user device also comprises an NFC controller 360 (e.g. for facilitating mobile payment), which could be integrated into the SE.

Figure 3B:
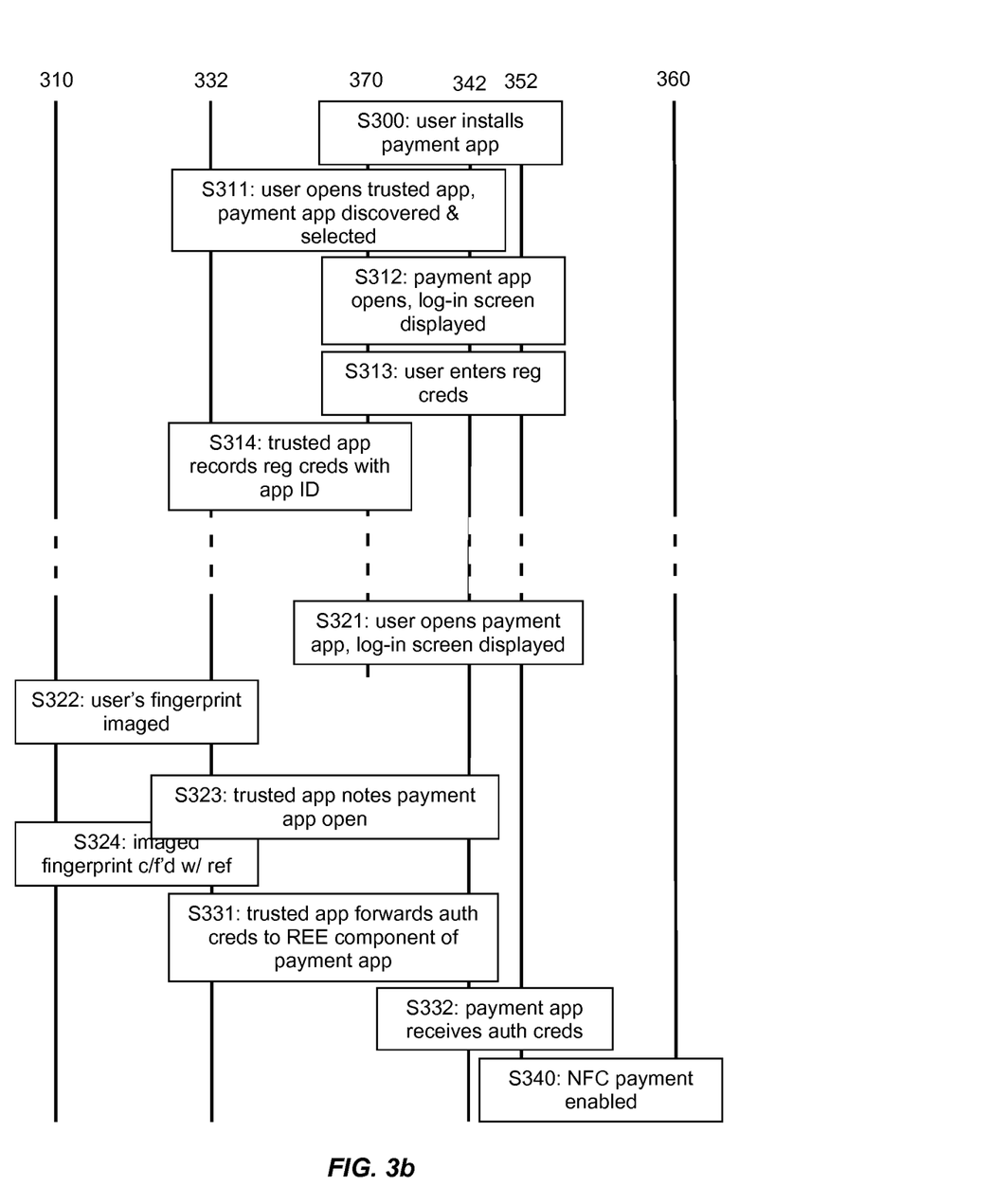

FIG. 3b is a flowchart illustrating an example of how a user can use the user device 300 of FIG. 3a to gain access to a secured function of a payment app 352, in this case NFC payment.

In this example, user interface device 370 is a touchscreen. However it is to be understood that it could be replaced by one or more other suitable user interface devices, such as a monitor or speaker for providing information to the user and a mouse or microphone for receiving user input. Similarly, in this example biometric sensor device 310 is a fingerprint reader, but it could be any other suitable device, e.g. an iris scanner.

At the start of the process, it is assumed that biometric sensor device 310 and trusted biometric application 332 (hereafter referred to as the trusted app for brevity) are already configured to be able to validate the identity of a user, the user having previously completed a biometric registration procedure. The trusted app could store reference biometric data of the user and optionally other people or could retrieve their reference data from an external database when required for comparison with newly collected data.

At step S300, a user installs a payment app 352 on their user device 300, for example by using touchscreen 370 to download it from an app store or inserting a smart card storing the payment app into the user device.

At step S311, the user uses the touchscreen to open the trusted app and instruct it to discover and open the payment app. (Alternatively, the trusted app could already be running in the background and, in response to discovering that the payment app has been installed, could cause the touchscreen to present the user with the option to register the payment app for biometric access.)

At step S312, the payment app opens in the normal way and, if all of its functions are secured by a single log-in process, the user is presented with a log-in screen immediately, or as soon as they attempt to access any secured function. (It could be the case that only some functions of the payment app are secured, and/or different functions require different authentication credentials, in which case the user navigates to the log-in screen for the secured function they wish to register for biometric access. In this example it is assumed that a single log-in is required to access any secured functions of the payment app.)

At step S313 the user uses the touchscreen to enter the required log-in details (for example one or more of a PIN, password, passcode or security question answer) which act as registration credentials for the trusted app to link to the payment app (or the particular secured function of it). At step S314 the trusted app records the registration credentials together with an identifier of the payment app. If the user device is used by multiple users, reference biometrics can also be stored with the registration credentials and payment app identifier.

At a later time, when the user opens the payment app they are presented with the log-in screen again (S321). At step S322 the user then places their finger on the fingerprint reader, which images the user's fingerprint. At this point, the trusted app (which is running in the background) wakes up and notes that the payment app (as opposed to any other apps registered with it) is running (step S323).

At step S324 the collected fingerprint image is compared to a reference fingerprint image for the user, either by the trusted app or a separate process running on a processor of the fingerprint reader, and if there is a match the trusted app receives this result as a biometric validation. If the user device is used by multiple users, and the current user is not already known (for example from the user having to log in to the user device on start-up) the comparison could be with reference fingerprint images for each user registered to use biometric authentication for the payment app.

If a fingerprint match is not found a message could be provided to the user to instruct them to try again, they could for example be allowed 3 attempts before they are notified that access to the payment app is blocked or the payment app's normal log-in screen is displayed, allowing them to access the app by manually re-entering their registration credentials.

In one alternative, provided the trusted app is only registered with one payment app, steps S321 and S323 can be omitted since use of the fingerprint reader can act as a request to open the payment app. In another alternative, instead of the trusted app continuously running in the background, the user could open it when required using the touchscreen. The trusted app could then present a request for biometric authentication and, following biometric validation, present them with a menu of apps registered with it. The user could then select the desired app which the trusted app would then open and log in to for them. In a variation of this alternative, placing a finger on the fingerprint reader (resulting in biometric validation) could open the trusted app, which could skip straight to presenting the registered app menu.

Once the trusted app has obtained both a biometric validation and an indication that access to the payment app is desired, at step S331 it passes authentication credentials (which could be the registration credentials themselves or could be derived from them by one or more manipulations) to app 342 (for example provided by a payment card issuer such as a bank) in the REE. At step S332, the app 342 passes the authentication credentials (or a manipulated version of them) to the payment app in the SE (for example provided by a card network organisation).

Finally, at step S340, the payment app prepares the transaction data to perform payment and communicates this data with the NFC controller 360, when the NFC controller is held close enough to a merchant's NFC controller. Alternatively, the transaction data could be returned to app 342 and returned over an internet connection (via e.g. WiFi, Bluetooth or GPRS) to a web merchant for an e-commerce transaction.

FIG. 4a shows a user device 400 with biometric functionality. Like user device 100 of FIG. 1, it comprises a biometric sensor device 410 and a main processor 420 having a TEE 430 and an REE 440. The TEE comprises a trusted OS 431 and a trusted biometric application 432. The REE comprises an OS 441 (for example Android™ or iOS™) and an application 442 (in this example, a payment app). The user device 400 further comprises at least one user interface device 470 (for example a touchscreen, keyboard, mouse, touchpad or microphone) at least capable of receiving user input. Optionally, the user device also comprises an NFC controller 460 (e.g. for facilitating mobile payment), which could be integrated into the SE.

Figure 4B:
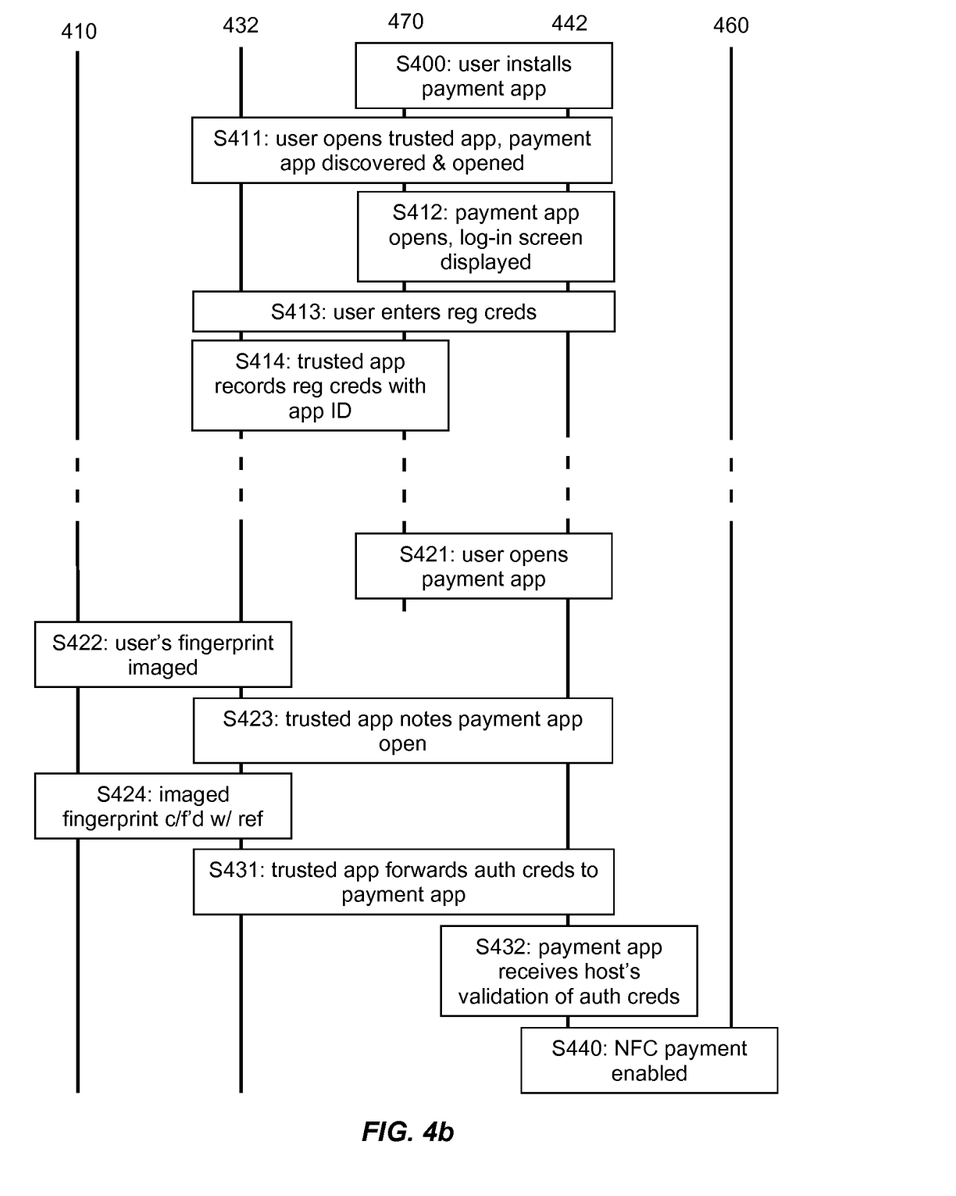

FIG. 4b is a flowchart illustrating an example of how a user can use the user device 400 of FIG. 4a to gain access to a secured function of a payment app 442, in this case NFC payment.

In this example, user interface device 470 is a touchscreen. However it is to be understood that it could be replaced by one or more other suitable user interface devices, such as a monitor or speaker for providing information to the user and a keyboard, mouse or microphone for receiving user input. Similarly, in this example biometric sensor device 410 is a fingerprint reader, but it could be any other suitable device, e.g. an iris scanner.

At the start of the process, it is assumed that biometric sensor device 410 and trusted biometric application 432 (hereafter referred to as the trusted app for brevity) are already configured to be able to validate the identity of a user, the user having previously completed a biometric registration procedure. The trusted app could store reference biometric data of the user and optionally other people or could retrieve their reference data from an external database when required for comparison with newly collected data.

At step S400, a user installs a payment app 442 on their user device 400, for example by using touchscreen 470 to download it from an app store.

At step S411, the user uses the touchscreen to open the trusted app and instruct it to discover and open the payment app. (Alternatively, the trusted app could already be running in the background and, in response to discovering that the payment app has been installed, could cause the touchscreen to present the user with the option to register the payment app for biometric access.)

At step S412, the payment app opens in the normal way and, if all of its functions are secured by a single log-in process, the user is presented with a log-in screen immediately, or as soon as they attempt to access any secured function. (It could be the case that only some functions of the payment app are secured, and/or different functions require different authentication credentials, in which case the user navigates to the log-in screen for the secured function they wish to register for biometric access. In this example it is assumed that a single log-in is required to access any secured functions of the payment app.)

At step S413 the user uses the touchscreen to enter the required log-in details (for example one or more of a PIN, password, passcode or security question answer) which act as registration credentials for the trusted app to link to the payment app (or the particular secured function of it). At step S414 the trusted app records the registration credentials together with an identifier of the payment app. If the user device is used by multiple users, reference biometrics can also be stored with the registration credentials and payment app identifier.

At a later time, when the user opens the payment app they are presented with the log-in screen again (S421). At step S422 the user then places their finger on the fingerprint reader, which images the user's fingerprint. At this point, the trusted app (which is running in the background) wakes up and notes that the payment app (as opposed to any other apps registered with it) is running (step S423).

At step S424 the collected fingerprint image is compared to a reference fingerprint image for the user, either by the trusted app or a separate process running on a processor of the fingerprint reader, and if there is a match the trusted app receives this result as a biometric validation. If the user device is used by multiple users, and the current user is not already known (for example from the user having to log in to the user device on start-up) the comparison could be with reference fingerprint images for each user registered to use biometric authentication for the payment app.

If a fingerprint match is not found a message could be provided to the user to instruct them to try again, they could for example be allowed 3 attempts before they are notified that access to the payment app is blocked or the payment app's normal log-in screen is displayed, allowing them to access the app by manually re-entering their registration credentials.

In one alternative, provided the trusted app only has one secure application registered with it, steps S421 and S423 can be omitted since use of the fingerprint reader can act as a request to open the payment app. In another alternative, instead of the trusted app continuously running in the background, the user could open it when required using the touchscreen. The trusted app could then present a request for biometric authentication and, following biometric validation, present them with a menu of apps registered with it. The user could then select the desired app which the trusted app would then open and log in to for them. In a variation of this alternative, placing a finger on the fingerprint reader (resulting in biometric validation) could open the trusted app, which could skip straight to presenting the registered app menu.

Once the trusted app has obtained both a biometric validation and an indication that access to the payment app is desired, at step S431 it passes authentication credentials (which could be the registration credentials themselves or could be derived from them by one or more manipulations) to the payment app 442 (for example provided by a card network organisation) in the REE. At step S432, the payment app passes the authentication credentials (or a manipulated version of them) to a host (not shown) for verification. In this case, the authentication credentials can be part of the payment authorisation request. At step S433, the host validates the authentication credentials to the payment app.

Finally, at step S440, the payment app communicates with the NFC controller 460 to facilitate payment when the NFC controller is held close enough to a merchant's NFC controller.

Figure 5:
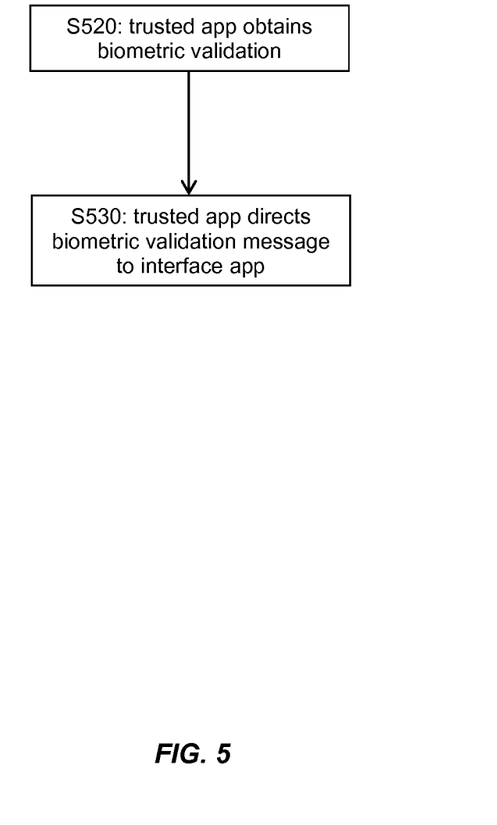
FIG. 5 is a flowchart outlining a method of a second implementation.

FIG. 5 is a flowchart setting out the method of the second implementation. At step S520 a trusted application of a TEE obtains a biometric validation of a user's identity. In response to obtaining the biometric validation, at step S530 the trusted application directs a biometric validation message over a secure channel towards an interface application of the SE configured to communicate with an external application of an SE outside of the TEE having a secured function.

Figure 6A:
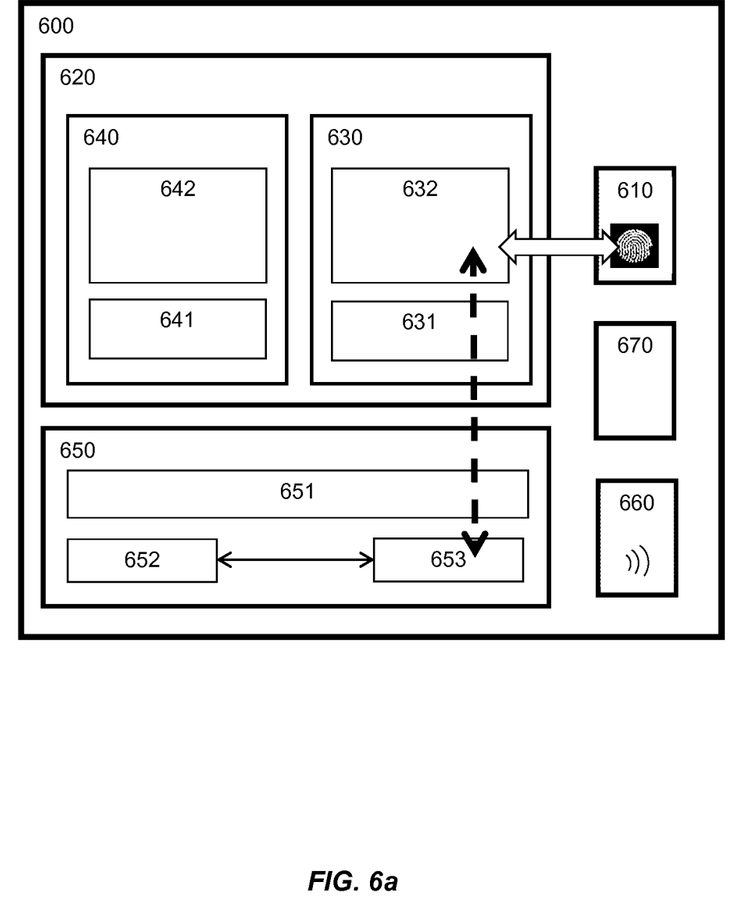
FIG. 6a illustrates a user device suitable for the second implementation.

FIG. 6a illustrates schematically an example user device configuration the second implementation is suitable for use with. It omits components which are not pertinent to the methods described for the sake of clarity. It is to be understood that additional components, for example similar to the components of user device 100 of FIG. 1 which do not correspond to components of FIG. 6a, or other components typically found in user devices, could also be included.

FIG. 6a shows a user device 600 with biometric functionality. Like user device 100 of FIG. 1, it comprises a biometric sensor device 610, a main processor 620 having a TEE 630 and an REE 640, and an SE 650 (for example an embedded Secure Element or eSE). The TEE comprises a trusted OS 631 and a trusted biometric application 632. The REE comprises an OS 641 (for example Android™ or iOS™) and an application 642. The SE comprises a secure OS 651 (for example a combination of JavaCard™ and Global Platform™), a secure application 652 (for example a mobile payment application cardlet) and an interface application 653 (for example a biometric interface cardlet). The user device 600 optionally further comprises at least one user interface device 670 (for example a touchscreen, keyboard, mouse, touchpad or microphone) at least capable of receiving user input and an NFC controller 660 (e.g. for facilitating mobile payment), which could be integrated into the SE.

Figure 6B:
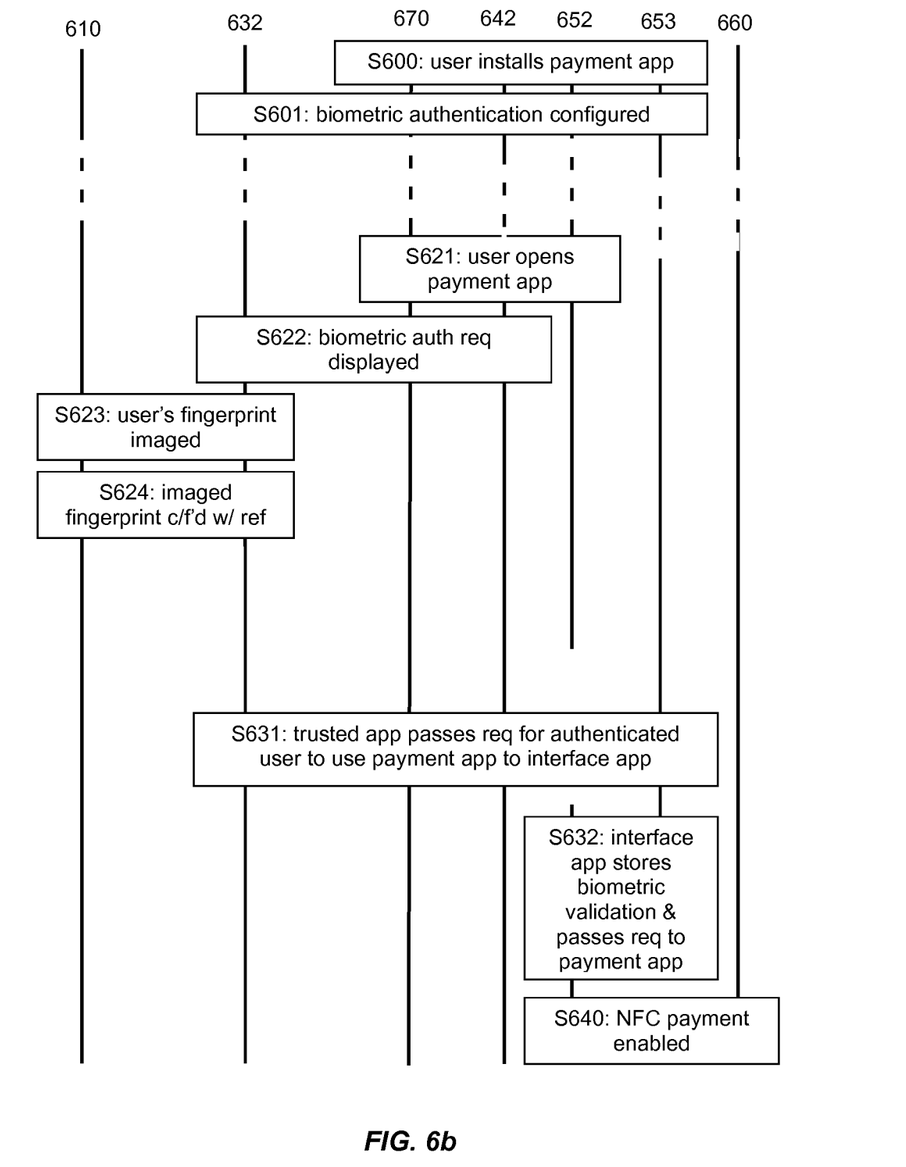
FIG. 6b is a flowchart detailing an example of the second implementation.

FIG. 6*b* is a flowchart illustrating an example of how a user can use the user device 600 of FIG. 6*a* to gain access to a secured function of a payment app 652, in this case NFC payment.

In this example, user interface device 670 is a touchscreen. However it is to be understood that it could be replaced by one or more other suitable user interface devices, such as a monitor or speaker for providing information to the user and a mouse or microphone for receiving user input. Similarly, in this example biometric sensor device 610 is a fingerprint reader, but it could be any other suitable device, e.g. an iris scanner.

At the start of the process, it is assumed that biometric sensor device 610 and trusted biometric application 632 (hereafter referred to as the trusted app for brevity) are already configured to be able to validate the identity of a user, the user having previously completed a biometric registration procedure. The trusted app could store reference biometric data of the user and optionally other people or could retrieve their reference data from an external database when required for comparison with newly collected data.

At step S600, a user installs a payment app (comprising apps 642 and 652) on their user device 600, for example by using touchscreen 670 to download it from an app store. The user interface component 642 of the payment application is installed in REE 640, while the secure functionality 652 of the payment application is installed in the SE 650.

At step S601 the trusted app (which is running in the background) discovers that the payment app has been installed and causes the touchscreen to request confirmation that the user would like to use biometric authentication for payment with the payment app. Upon confirmation from the user, this preference is registered in component 642 of the payment application. Alternatively, the user could later decide that biometric authentication would be preferable to the app's standard authentication procedure. Upon instruction from the user, this preference is registered in the trusted app.

At a later time, when the user requires access to the payment app, they use the touchscreen to open the payment app (step S621). Alternatively, the payment app could be opened by tapping the user device on a contactless reader (not shown).

At step S622, the trusted app then intervenes to cause the touchscreen to display a request for biometric authentication, for example a fingerprint symbol and/or a message indicating that the user should place their finger on a fingerprint reader comprised in or attached to the user device.

At step S623, the user places their finger on the fingerprint reader, which images the user's fingerprint. At step S624 the collected fingerprint image is compared to a reference fingerprint image for the user, either by the trusted app or a separate process running on a processor of the fingerprint reader, and if there is a match the trusted app receives this result as a biometric validation.

Once the trusted app has obtained a biometric validation, at step S631 it informs interface application 653 in the SE over a secure channel that an authorised user requires access to the payment app. The secure channel is secured in that communications over it are protected for integrity and authenticity using a secret key known to both the trusted app and the interface app. In this example the interface app is a cardlet with Global Platform Privilege indicating Cardholder Verification Method Management. The trusted app and the interface cardlet could for example both be installed during manufacture of the user device before it is issued to a user and both programmed with the same unique cryptographic key at that time. In that case, no key exchange is required between them.

At step S632 the interface app stores the biometric validation so that it can be read by registered apps on the SE and requests that the payment app permits user access. This could for example be by means of a Shared Interface Object (SIO). This can be done securely without any encryption since both the interface cardlet and the payment app are within the SE. Spoofing and main-in-the-middle attacks are prevented by the secure OS 651 as part of its regular functionality.

Finally, at step S640, the payment app prepares the transaction data to perform payment and communicates this data with the NFC controller 660 to facilitate payment when the NFC controller is held close enough to a merchant's NFC controller. Alternatively, the transaction data could be returned to app 642 and returned over an internet connection (for example via WiFi, Bluetooth or GPRS) to a web merchant for an e-commerce transaction.

If multiple apps are registered for biometric authentication by the same user, then a single biometric validation could be used for all of them. For example a biometric validation could be used to log in to the user device or to a secure session on it. The interface app could store the biometric validation for a predetermined time, or until an inactivity timer runs out. Such an inactivity timer could be one existing on the device to put it in to sleep or power-save mode after a predetermined period without receipt of user input.

Many modifications and variations can be made to the above-described implementations within the scope of the invention. Other implementations will be apparent to those skilled in the art from consideration of the specification and practice of the implementations disclosed herein. It is intended that the specification and examples be considered as exemplary only, with a true scope and spirit of the invention being indicated by the following claims. In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim.

The invention claimed is:

1. A computer-implemented method for operating a user device having at least a trusted application and an external application installed on the user device, the method comprising:

operating the trusted application to obtain registration credentials which are configured to be entered by a user to log in to a secured function of the external application, wherein the trusted application is in a Trusted Execution Environment of the user device and the external application is on the user device and outside the Trusted Execution Environment;

causing the trusted application to store the registration credentials with an identifier of the external application and/or the secured function;

receiving an indication that the user requires access to the secured function which can only be accessed following validation of an identity of the user;

performing a biometric validation of the identity of the user based at least in part on data collected from a biometric sensor associated with the user device, the biometric validation being performed within the Trusted Execution Environment; and in response to said performing the biometric validation, causing authentication credentials to be passed from the trusted application to the secured function of the external application to obtain access to the secured function, wherein the authentication credentials are based on the registration credentials.

2. The method of claim 1, wherein either:

said authentication credentials comprise at least some of the registration credentials; or the method further comprises the trusted application processing at least some of the registration credentials, optionally together with input from the external application, to produce said authentication credentials.

3. The method of claim 1, wherein the external application resides in at least one of a Secure Element and a Rich Execution Environment.

4. The method of claim 1, further comprising:

receiving the authentication credentials at the external application;

operating the external application to validate the authentication credentials; and operating the external application to provision of access to the secured function to the user.

5. A computer-implemented method for operating a user device having at least a trusted application and an external application operating on the user device, the method comprising:

operating the trusted application to obtain a biometric validation of an identity of a user based at least in part on data collected from a biometric sensor of the user device, the trusted application stored in a Trusted Execution Environment of the user device and the biometric validation being performed within the Trusted Execution Environment of the user device; and in response to said obtaining the biometric validation, operating the trusted application to pass a user identity validation message over a secure channel to an interface application of a Secure Element on the user device configured to communicate with the external application that resides in the Secure Element outside of said Trusted Execution Environment on the user device, in response to obtaining an indication that the user requires access to said secured function, directing, by the interface application, a biometric authentication message towards the external application, the external application having the secured function which can only be accessed following validation of the identity of the user.

6. The method of claim 5, further comprising the external application receiving the biometric authentication message and, subsequent to receiving of the biometric authentication message, providing the user with access to the secured function.

7. The method of claim 5, wherein the channel is secured by means of the trusted application and the interface application both having knowledge of a cryptographic key.

8. The method of claim 5, wherein:

one or both of the external application and the interface application are cardlets, and optionally if both of the external application and the interface application are cardlets, a further request is made through a Shared Interface Object.

9. The method of claim 5, wherein the interface application is a cardlet having Global Platform Privilege indicating Cardholder Verification Method Management.

10. The method of claim 5, wherein the interface application is further configured to communicate with a further external application of the Secure Element outside of the Trusted Execution Environment, the further external application having a further secured function which can only be accessed following validation of the identity of the user;

the method optionally further comprising the interface application directing a further biometric authentication message towards the further external application;

said directing of said further biometric authentication message optionally being in response to one of the trusted application and the further external application obtaining an indication that the user requires access to said further secured function and subsequently directing a request for access to the further secured function towards the interface application;

the method optionally further comprising the further external application receiving the further biometric authentication message and, subsequent to said receiving of the further biometric authentication message, providing the user with access to the further secured function.

11. A user device having at least a trusted application and an external application operating thereon, the user device comprising:

a processor; and a memory in communication with the processor, the memory storing program instructions, the processor operative with the program instructions to perform functions as follows:

operating a trusted application to obtain a biometric validation of an identity of a user based at least in part on data collected from a biometric sensor of the user device, the trusted application stored in a Trusted Execution Environment of the user device and the biometric validation being performed within the Trusted Execution Environment of the user device; and in response to said obtaining the biometric validation, operating the trusted application to pass a user identity validation message over a secure channel to an interface application of a Secure Element on the user device configured to communicate with the external application that resides in the Secure Element outside of said Trusted Execution Environment on the user device, in response to obtaining an indication that the user requires access to said secured function, directing, by the interface application, a biometric authentication message towards the external application, the external application having the secured function which can only be accessed following validation of the identity of the user.

* * * * *